Nov. 7, 1950 — C. K. STEINS — 2,529,431
POWER-OPERATED VALVE
Filed Oct. 13, 1945 — 2 Sheets-Sheet 1
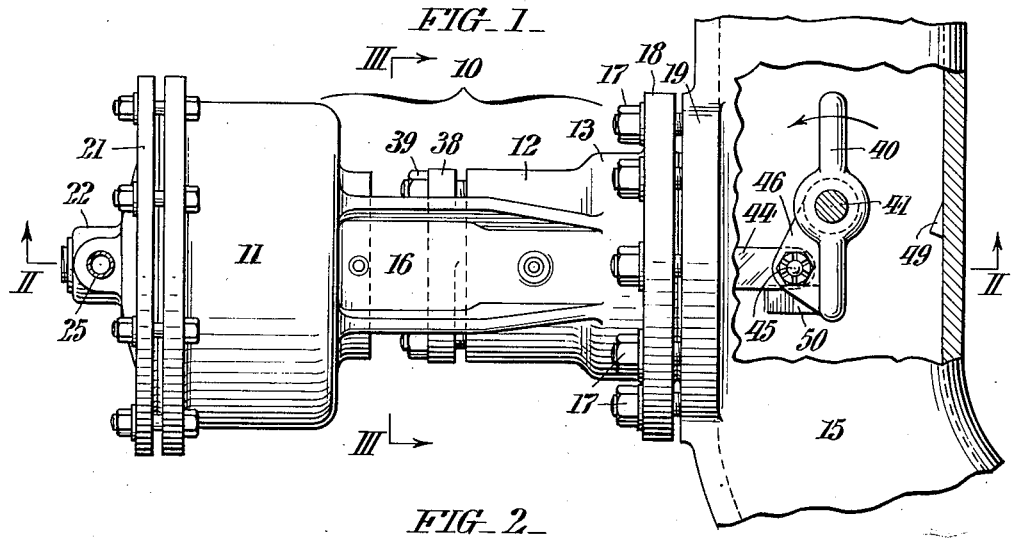
FIG. 1
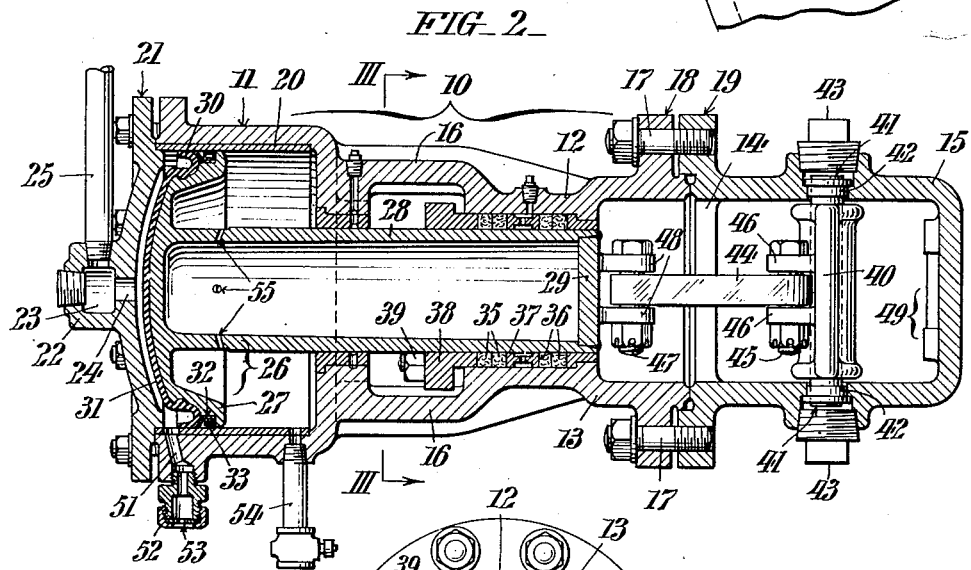
FIG. 2
FIG. 3
WITNESSES
Hubert Fuchs
Thomas W. Kerr, Jr.
INVENTOR:
Carleton K. Steins
BY Paul & Paul
ATTORNEYS.

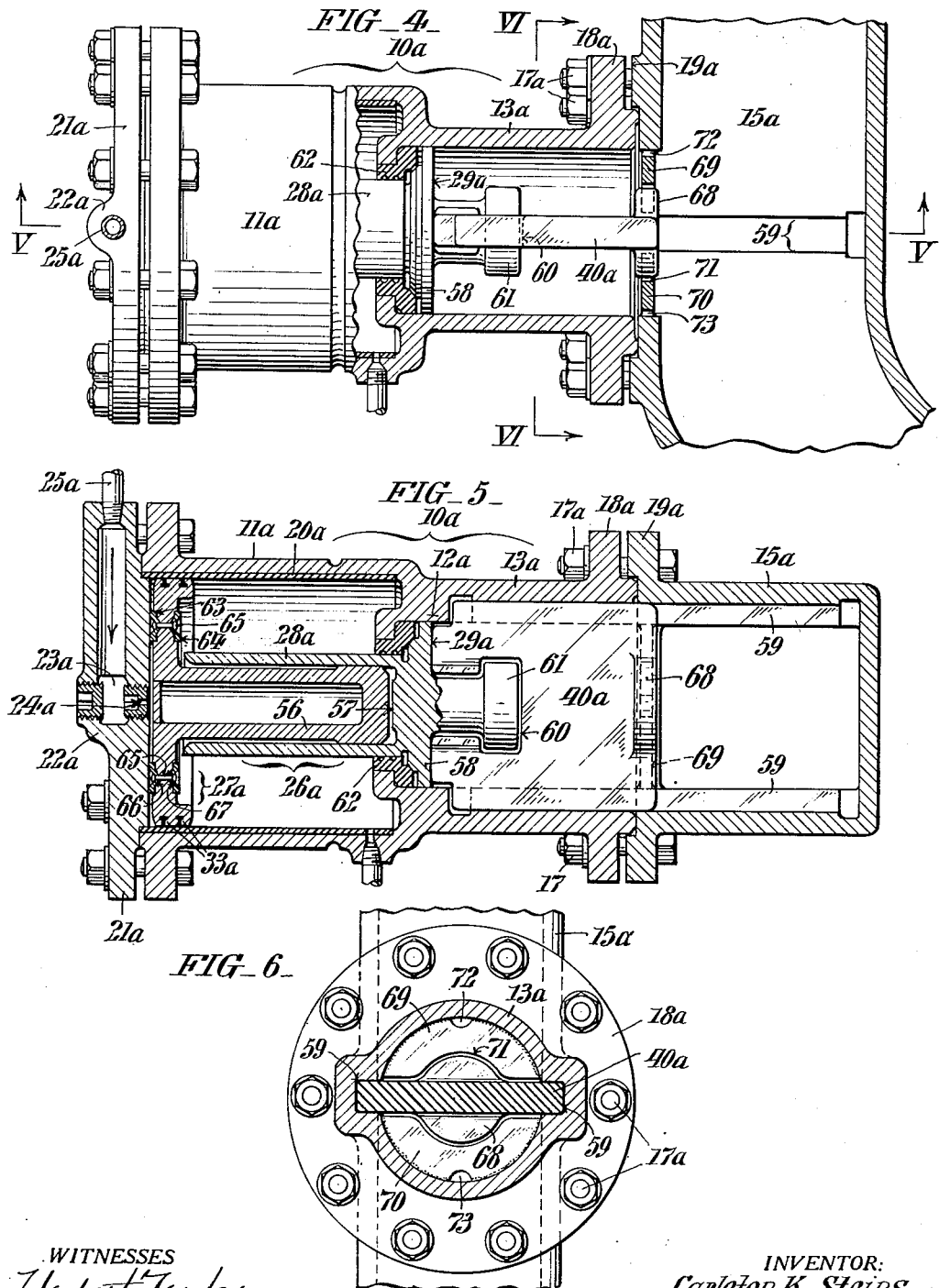

Patented Nov. 7, 1950

2,529,431

UNITED STATES PATENT OFFICE 2,529,431

POWER-OPERATED VALVE

Carleton K. Steins, Merion, Pa., assignor to The Pennsylvania Railroad Company, Philadelphia, Pa., a corporation of Pennsylvania Application October 13, 1945, Serial No. 622,203

2 Claims. (Cl. 137—139)

This invention relates to valves designed for operation by power, i. e., by compressed air, steam or other fluid pressure medium, and useful, for example, in connection with automatic wheel slip prevention mechanisms for locomotives such as disclosed in my copending patent application Serial No. 591,134 filed by me on April 30, 1945, now matured into Patent 2,440,124.

The chief aim of my invention is to provide a valve of the kind referred to which is simple in construction; which is immune against easy derangement; and which can be relied upon to function properly under all conditions of service.

Other objects and attendant advantages will appear from the following detailed description of the attached drawings, wherein Fig. 1 is a fragmentary view partly in side elevation and partly in section, of a power operated valve conveniently embodying my invention in one form.

Fig. 2 is an axial section of the valve taken as indicated by the angled arrows II—II in Fig. 1.

Fig. 3 is a transverse section taken as indicated by the angled arrows III—III in Figs. 1 and 2.

Fig. 4 is a view like Fig. 1 showing an alternative embodiment of my invention.

Figs. 5 and 6 are in axial section and a transverse section taken as respectively indicated by the angled arrows in Fig. 4.

With reference first more particularly to Figs. 1, 2 and 3 of these drawings, my improved valve, as there illustrated, is characterized by having a housing 10 which provides a cylinder 11 of relatively large diameter, and an axially aligned smaller cylinder 12 with a somewhat diametrically expanded extension 13 to fit over a lateral orifice 14 in a conduit 15 in which the flow of fluid such as steam is to be controlled or regulated. As shown, the cylinders 11 and 12 are spaced endwise by a longitudinal interval but integrally connected by two webs 16 disposed in diametrically opposed relation with respect to the axis of the valve body 10, which latter is secured in place by headed screw bolts 17 whereof the threaded shanks pass through an apertured flange 18 on said body and engage into a mating flange 19 on the conduit 15. The large cylinder 11 is provided with a replaceable lining 20, and is closed by a removable bolt-secured cover 21 having a central boss projection 22 with a hollow 23, which, by way of a port 24 communicates with the interior of said cylinder. Connecting into the boss 22 is a pipe 25 through which a pressure fluid actuating medium, such as compressed air, can be admitted to the cylinder 11. Within the housing 10 is a differential piston means 26 which, in this instance, is of unitary construction with a head portion 27 of large diameter to operate in the cylinder 11, and a diametrically reduced hollow portion or prolongation 28 to operate in the cylinder 12, the hollow of the latter portion being closed by a weld secured filler disk 29 which serves as a piston face exposed to the action of fluid traversing the conduit 15. Secured over the back of the piston head 27 with its peripheral edge retroverted as at 30 for snug fluid-tight engagement with the lining in the cylinder 11, is a buffer covering 31 of relatively stiff shock absorbing material whereof the edge is retroverted and braced by a channel section annulus 32 of sheet metal abutting a circumferential shoulder on said piston head, said annulus also serving as a retainer for an auxiliary sealing element or piston ring 33. Leakage from within the conduit 15 around the small diameter or differential piston portion 28 is prevented by packing rings 35 and 36 at opposite sides of a spacer 37 surrounding said portion within the cylinder 12 and held in compression by a gland 38 whereof the clamp bolt heads 39 are readily accessible in the interval between the two cylinders.

Forming part of the valve, but located in the conduit 15, is a closure element 40 of the butterfly type with diametrical trunnions 41 which are supported for pivoting action in bushings 42 set into aligned apertures in opposite side walls of said conduit and accessible upon removal of the screw plugs indicated at 43. The closure element 40 is coupled for operation by the piston 26 through a link 44 whereof one end fits between and is pivotally connected by a bolt 45 to a pair of ears 46 on said element, and whereof the other end similarly fits between and is pivotally connected by a bolt 47 to a pair of ears 48 on the filler disk 29 at the small end portion 28 of said piston. The projection shown at 49 (Figs. 1 and 2) on the rear wall of the conduit 15 acts as a stop to prevent turning of the closure element 40 beyond its fully closed position in a manner later on explained. Other projections 50 on opposite side walls of the conduit limit movement of the closure element in opening.

In addition to the features already described, the cylinder 11 is provided adjacent its outer end with a lateral relief port 51 into which is screwed a bleed fitting 52 with a diaphragm 53 having a small opening of suitable size to control the rate of escape of pressure fluid from behind the piston head 27 after each actuation of the valve also as later on set forth. Relief of pressure and drainage of moisture condensation from the cylinder 11 forwardly of the piston head 27 is allowed to take place through a drain pipe 54, while the apertures at 55 in Fig. 2 establish communication between said cylinder and the hollow of the piston extension for the purposes of pressure equalization.

Operation of Figures 1 to 3

Normally the closure element 40 is maintained in the open position in which it is shown by pressure of the fluid passing through the conduit 15 upon the exposed small end portion 28, 29 of the piston 26. When flow through the conduit 15 is to be decreased or interrupted, pressure fluid is admitted, by way of the pipe 25, to the large cylinder 11 for action upon the piston head 27. As a result, the piston 26 as a whole will be shifted rightward in Fig. 2, and, through the link 44, cause swinging of the closure element 40 counterclockwise in Fig. 1 to closed position against the stop projection 49 within said conduit. When subsequently the supply of actuating pressure fluid to the cylinder 11 is cut off, the piston 26 will be bodily moved leftward by action of the fluid pressure in the conduit 15 upon its small end 29, with attendant turning of the closure element 40 clockwise in Fig. 1 back to its normal open position against the stops 50. Rapid recession of the piston 26 during the opening movement of the closure element 40 is prevented by temporary trapping of the actuating pressure fluid in the cylinder and control of its escape through the bleed fitting 52.

In the alternative embodiment of my invention shown in Figs. 4–6, the piston means 26a is formed in two parts, one component providing the large diameter head 27a which has a relatively short hollow diametrically-reduced guide axial prolongation 56, and the other component being in the form of a sleeve 28a which is closed at one end as at 57, and which telescopically engages the prolongation of the first mentioned component with a freely sliding fit. The piston component 28a is moreover provided with a flange head 58 of a diameter considerably less than that of the head 27a of the first component and having a differential piston face 29a exposed to the action of the fluid passing through the conduit 15a. The closure element 40a in this instance is in the form of a slide with its opposite lateral edges engaged in guide grooves 59 in the side walls of the conduit 15a and in the cylinder 13a for confinement to movement to closed position crosswise of said conduit. The closure element 40a is notched as at 60 at its outer end for engagement by a headed terminal projection 61 at the contiguous end of the piston element 29a. This arrangement allows rotation of the piston head 29a with assurance against disconnection of the slide 40a therefrom. At the region of entry of the piston component 28a into the cylinder 11a, the latter is fitted with a bevel seat annulus 62 against which a beveled annular shoulder on the piston head 58 normally engages as shown in Fig. 5. From the latter illustration it will be further noted that the piston head 27a is provided on its opposite faces with buffer rings 63—64, which, in practice, may be of any suitable yielding or resilient material capable of reacting respectively with the opposite ends of the cylinder 11a in absorbing the shocks of impact as the piston is moved in opposite directions. The buffer rings 63, 64 are secured to the piston head 27a by rivets 65 whereof the heads are countersunk, and is otherwise held against displacement by virtue of being partially recessed into annular retaining grooves 66 and 67 in the opposite faces of said head.

As shown, the closure slide 40a is reinforced centrally of its front edge by a circular stiffening web 68, and the lateral orifice in the conduit is partially closed off by weld-secured segmental pieces 69 and 70, with resultant provision of a central opening 71 which is normally occupied by the aforesaid stiffening web with a certain amount of clearance thereabout for access of fluid from said conduit to the face of the differential piston head 29a. Notches 72 and 73 in the segments 69 and 70 provide small openings for a like purpose. By this construction, the orificed wall of the conduit 15a is rendered substantially continuous with preclusion of turbulence which would otherwise occur and impede or retard passage of fluid through the conduit.

Operation of Figures 4 to 6

Upon admission of pressure fluid by way of pipe 25a, into the cylinder 11a, the piston 27a is forced forward, taking with it the piston 29a and in turn the slide 40a which is thereby moved to closed position across the conduit 15a. Upon exhausting the cylinder 11a, likewise by way of pipe 25a in this instance, the closure element 40a will be shifted to open position by action of the pressure of fluid in the conduit 15a upon the face of the differential piston 29a which latter will take the larger piston 27a with it in a manner readily understood from the drawings. By suitable means, not shown, exhaust through the pipe 25a may be controlled to prevent too rapid opening of the valve and banging of the differential piston head 29a against the seat annulus 62. Movement of the larger piston 27a in opposite directions incident to valve opening and closing is limited and buffeted by the rings 63 and 64 as previously pointed out. It is to be noted that the end of the prolongation 56 of the piston 27a is normally clear of the bottom of the bore in the extension 28a of piston head 29a, so that the bevel on the latter will bear firmly against the seat on the annulus 62 as shown.

If desired or found convenient, the cylinder 11a may be provided with a bleed fitting similar to the one described in connection with the first described embodiment of my invention to prevent too rapid exhaust of said cylinder during valve opening.

Having thus described my invention, I claim:

1. A power operated valve of the character described comprising a housing with two serially-arranged rigidly-united cylinders of large and small diameter, the large cylinder being closed and the small cylinder being open at its outer end and registered with a lateral orifice in a conduit; a separate closure element for regulating flow of pressure fluid through the conduit; a piston head in the large cylinder; a sleeve slidable on a diametrically reduced axial extension of the piston head, said sleeve extending into and having a piston head in the small cylinder; means within the small cylinder operatively connecting the closure element to the head end of the sleeve; and means whereby pressure fluid can be admitted to the outer end of the larger cylinder for action upon the piston head therein to bring about the movement of the closure element to closed position.

2. The invention according to claim 1, wherein the closure element has the form of a slide with guidance transversely of the conduit.

CARLETON K. STEINS.

REFERENCES CITED

The following references are of record in the file of this patent:

UNITED STATES PATENTS

| Number | Name | Date |
|---|---|---|
| 399,663 | Glass | Mar. 19, 1889 |
| 560,132 | Bragger | May 12, 1896 |
| 750,649 | Hove | Jan. 26 1904 |
| 870,792 | McAlear | Nov. 20, 1907 |
| 1,212,177 | Benjamin | Jan. 16, 1917 |
| 2,395,212 | Blanchard | Feb. 19, 1946 |

FOREIGN PATENTS

| Number | Country | Date |
|---|---|---|
| 4,651 | Great Britain | Sept. 29, 1883 |
| 403,609 | Great Britain | Mar. 21 1932 |